United States Patent [19]

Schriner

[11] Patent Number: 5,149,051
[45] Date of Patent: Sep. 22, 1992

[54] KEYBOARD FLIP STAND

[75] Inventor: Michael J. Schriner, Rocky River, Ohio

[73] Assignee: Microvision, Inc., Westlake, Ohio

[21] Appl. No.: 798,344

[22] Filed: Nov. 20, 1991

Related U.S. Application Data

[63] Continuation of Ser. No. 607,594, Oct. 31, 1990, abandoned, which is a continuation of Ser. No. 443,441, Nov. 30, 1989, abandoned.

[51] Int. Cl.$^5$ ............................................. F16M 11/00
[52] U.S. Cl. ................................... 248/918; 248/174; 248/176; 248/205.3; 248/127; 248/676; 248/143
[58] Field of Search ............ 248/176, 174, 918, 205.3, 248/127, 676, 143

[56] References Cited

U.S. PATENT DOCUMENTS

| | | | |
|---|---|---|---|
| 729,619 | 6/1903 | Luensmann | 248/143 |
| 1,943,214 | 1/1934 | Dube | 248/126 X |
| 3,598,394 | 8/1971 | Miller . | |
| 3,872,868 | 3/1975 | Kline . | |
| 3,885,698 | 5/1975 | Lebel et al. | 248/133 X |
| 3,984,075 | 10/1976 | Bahner et al. | 248/676 |
| 4,073,460 | 2/1978 | Dale | 248/441.1 X |
| 4,330,161 | 5/1982 | Khawand | 248/205.3 X |
| 4,511,111 | 4/1985 | Godfrey et al. | 248/459 |
| 4,840,344 | 6/1989 | Morol | 248/676 |
| 4,843,977 | 7/1989 | Bridges . | |
| 4,852,500 | 8/1989 | Ryburg et al. | 248/918 X |
| 4,871,139 | 10/1989 | Lowke et al. | 248/451 X |
| 4,911,389 | 3/1990 | Self | 248/205.3 X |
| 5,000,760 | 8/1991 | Singer | 248/918 X |

FOREIGN PATENT DOCUMENTS 2551466 5/1977 Fed. Rep. of Germany ... 248/441.1

OTHER PUBLICATIONS

Misco Catalog, Noted Exhibit A-3 in upper right corner (1989).

*Primary Examiner*—Alvin C. Chin-Shue
*Attorney, Agent, or Firm*—Watts, Hoffmann, Fisher & Heinke Co.

[57] ABSTRACT

A flip stand for storing a computer keyboard in an essentially upright position and permitting its easy movement to a use position is shown. The stand consists essentially of a rigid base, a rigid wall extending substantially orthogonally from one edge of the base, and an adherent deposit that is sufficiently strong to hold the keyboard to the stand while the stand and keyboard assembly is elevated for storage and when it is turned down to a use position.

6 Claims, 2 Drawing Sheets

KEYBOARD FLIP STAND

This application is a continuation of application Ser. No. 607,594, filed Oct. 31, 1990, now abandoned, which is a continuation of Ser. No. 443,441, filed Nov. 30, 1989.

This invention relates to a keyboard flip stand for storing a computer keyboard in an essentially upright position and permitting its easy movement to a use position that usually will be horizontal with respect to the keyboard base.

BACKGROUND OF THE INVENTION

The applicant is aware of rocking frames for storing and pouring liquids from awkward carboys and flasks, wine bottle rockers, also for pouring, and the like. However, he is unaware of any stands like the instant one for storing a computer keyboard. Typically, these are stored under a cabinet having a display screen, are drawn out frontally for use, then pushed back in. From time to time, however, it may be desirable to use the keyboard in another position than the single use position thus conventionally afforded.

Advantages of the instant invention include the ability to move the keyboard about for use without detaching it from a frame or deck or even from an electrical connection with the other equipment. Other advantages include simplicity, light weight, economy, and permitting the use of a somewhat oversize keyboard relative to the available storage space under other equipment.

BROAD STATEMENT OF THE INVENTION

The inventive stand consists essentially of a rigid base, a rigid wall extending substantially orthagonally from one end of the base, and, on the inside of the wall, on the inside of the base, or at both these places, an adherent connector that is sufficiently strong to bind the keyboard to the stand as an assembly when said assembly is put into a storage position standing on the outside of the base and when said assembly is lowered into a use position resting on the outside of the wall of the stand.

DETAILED DESCRIPTION OF THE DRAWING

Figure 1:
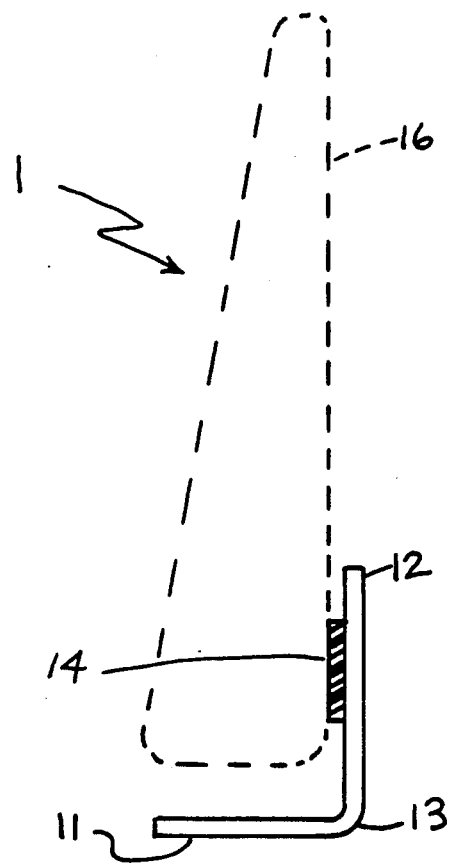
FIG. 1 shows the stand in side elevation view with conventional computer keyboard in place in stored position. The keyboard is represented in dotted outline.

In FIG. 1 arrow 1 refers to the inventive stand with a computer keyboard (depicted broadly in dotted outline 16 without showing keys) adhesively attached to it and standing in a storage position. Rotation of the assembly downwardly to the right so that wall 12 is at rest in a horizontal position and base 11 is essentially vertical puts the keyboard 16 into a use position.

The keyboard is for an IBM PC computer; it is about 19½ inches long, 8 inches wide and 2 inches thick.

The keyboard 16 adheres to the inside of the wall 12 by the grip of double-faced adhesive tape 14 sticking it strongly to wall 12. The tape 14 has a thin spongy core. Base 11 and wall 12 are unitary and of clear thermoplastic polymethylmethacrylate polymer about ⅛" thick; the joint 13 was rounded on a mandrel while the polymer was soft. At an ordinary use temperature the polymer assumes its quite rigid form that is ell-shaped in cross section. The wall 12 can be formed plus or minus a few degrees from the perpendicular with respect to base 11. Sometimes it has been fashioned with a 95°–97° angle with respect to the base 11, and this has proved quite satisfactory. The space under keyboard 16 allows for running its electric cord between it and base 11 without any disconnection.

Figure 2:
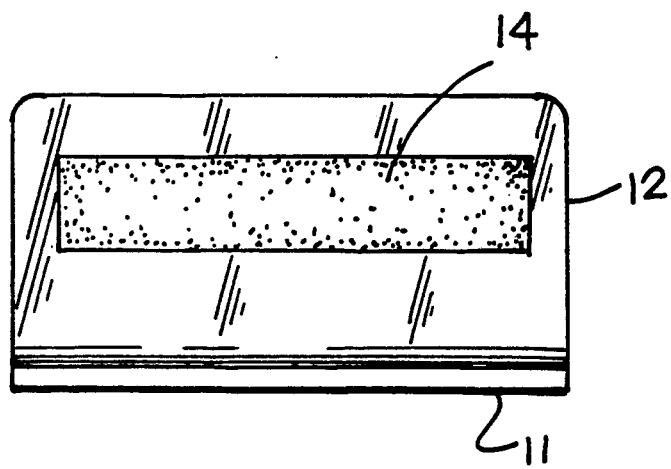
FIG. 2 is a front elevation view of the base-down stand look the adhesive element on the inner side of the wall.

The inside of wall 12 of the stand with the adhesive deposit 14 is shown plainly in FIG. 2.

Figure 3:
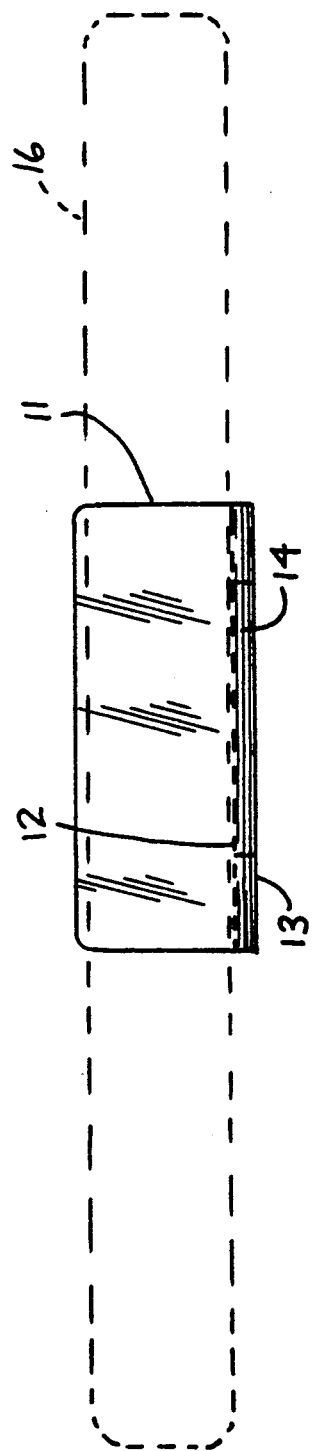
FIG. 3 is a rear elevation view of the base-up stand resting on its wall, the normal use position when the keyboard is in place and adhering to the stand. The keyboard again is indicated in dotted outline.

FIG. 3 shows how the keyboard 16 (depicted broadly in dotted outline without showing keys) desirably is fitted to the adhesive 14 and about center to the stand. The assembly here is in the wall-down, base-up position for use of keyboard 16. The keyboard 16 overhangs base 11 to each side of the stand about evenly. The stand is 6 inches in its longest dimension; its wall 12 extends 2⅝ inches upwardly and its base 11 extends 2¼ inches outwardly when in the storage position.

While a double-faced adhesive tape is preferred for adherent deposit 14, clearly it can be one or more deposits of other thick gummy material, even a permanent, hardenable glue in some cases. However, a preferred adherent deposit is pressure-sensitive, and it permits separation of the keyboard from the stand, this with appreciable effort. The exposed face of the tape or other adhesive deposit can be covered temporarily with a peelable protective film and removed before the keyboard is attached.

Other adherent deposits or elements also can be used to make the assembly in place of adhesives. Thus, a magnetized or magnetizable film can be stuck to the stand wall to grip magnetically to a corresponding magnetic or magnetizable adhesive tape on the keyboard. Magnetically- or adhesively-adherent tapes stuck to the wall of the stand and correspondingly to the keyboard also can be fitted with small engagable and disengagable elements such as hooks and eyes, studded heads and slots, etc. to make mechanical connections between the keyboard and the stand.

Ordinarily the adherent deposit is used on the wall so that the keyboard can be stored in a position elevated from the base about ⅜" or so to allow for passing an electric cord between it and the inside of the stand base. Because the usual keyboard has a rounded back (that looks downwardly in the stored position here), attachment of the keyboard to the base of the stand is less favored, but it can be used either alone or with adherent attachment also to the wall, if desired. Such attachment to the base or a double attachment, however, precludes laying a wire across the inside of the stand near the joint where the wall meets the base.

The preferred material of construction for the base and wall of the stand is a single piece of bent transparent thermoplastic material such as an acrylic or styrene polymer or copolymer. The stand, however, can be made opaque and/or in colors, if desired. Other materials such as one or more pieces of thermosetting resin composition, bent wood or metal can be used, but they also can have undesirable drawbacks—e.g. the wood often is thicker and bulkier, and the metal can have too much weight. A magnetizable stand also may be undesirable in a computer environment.

Clearly, the size of the instant flip stand should be adequate to render the assembly of keyboard and stand reasonably stable for use in the use position and stable in the stored position for storage. The assembly is the most efficient when the stand is substantially centered with respect to the balance of the keyboard, and this usually is central to the keyboard. A stand no thicker than about ⅜ inch is preferred for handling.

Although the invention has been described and depicted in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a keyboard and a keyboard stand comprising:
   a) the stand of consisting of:
      i) a rigid base of generally planar configuration;
      ii) a rigid wall extending generally orthogonally from said base and making a rigid joint therewith along one end of said base, the upper surface of the base and the inner side of the wall being substantially flat; and,
      iii) a pressure-sensitive adhesive deposit on the inner side of said wall;
   b) said deposit affixing the bottom of the keyboard to the inner side of the wall, the wall and the keyboard being selectively positionable in a substantially vertically oriented storage position;
   c) the base having a lower surface configured to support the combination on a support surface and maintain the combination in its vertical storage position;
   d) the keyboard being equipped with an electric cord;
   e) the keyboard being displaced from said joint sufficiently to allow passage of the electric cord behind said keyboard when in a use position, the deposit being disposed sufficiently beyond said joint to avoid contact with said electric cord; and,
   f) wherein the deposit, the base, and the wall being unobstructive to said passage of the electric cord across said joint, and the sizes of the base and the wall of the stand and the angle of the intersection therebetween being adequate for rendering the keyboard independently stable in the storage position.

2. The stand of claim 1 wherein the wall and the base are transparent.

3. The stand of claim 1 wherein the adherent deposit is a resilient and pressure-sensitive adhesive tape.

4. The flip stand of claim 1 wherein said base and wall are made of a single piece of thermoplastic polymer, and the joint between them is rounded for facilitating a rocking movement of the stand.

5. In combination:
   a) a keyboard stand consisting of;
      i) a rigid base joined to a rigid wall in a generally orthogonal relationship, said stand having a use position wherein the wall is generally horizontal and a storage position, wherein said wall is substantially vertical; and,
      ii) a pressure-sensitive adhesive deposit on an inner surface of said wall, said deposit being disposed in a spaced relation to the intersection of said base and said wall so that a keyboard affixed to said adhesive is unobstructive to the passage of an electric cord between the keyboard and said base;
   b) a keyboard adhered to said keyboard stand with the stand being generally central of, laterally speaking, the keyboard, whereby when said stand with said keyboard is moved to said storage position, said keyboard and stand combination is independently stable in a substantially upright position; and,
   c) said base having an external support surface for supporting and maintaining the combination in its upright position, the support surface having a lateral dimension substantially smaller than the transverse dimension of the keyboard.

6. A method of storing a keyboard in a front-up, rear-down, substantially erect position comprising:
   affixing said keyboard to a pressure-sensitive adhesive deposit on an inner side of a wall of a keyboard stand having a use position and a storage position, and pivoting said keyboard stand, with said keyboard affixed thereto, to said storage position, whereby said keyboard is independently stable in said generally erect position, said keyboard stand consisting of;
   a rigid base of generally planar configuration;
   a rigid wall extending generally orthogonally from said base and making a rigid joint therewith along end of said base, said wall being substantially vertical when in the storage position with a keyboard adhered thereto; the upper surface of the base and the inner side of the wall being flat; and said pressure-sensitive adhesive deposit being disposed on the inner side of said wall; and,
   the base having a lower surface configured to support the combination on a support surface and maintain the combination in its vertical storage position.

* * * * *